United States Patent

[11] 3,525,294

[72] Inventor Waldemar T. Rentschler
 Calmbach, Black Forest, Germany
[21] Appl. No. 720,590
[22] Filed April 11, 1968
[45] Patented Aug. 25, 1970
[73] Assignee Prontor-Werk Alfred Gauthier G.m.b.H.,
 Calmbach, Black Forest, Germany

[54] SHUTTER OPENING DELAY MECHANISM
 7 Claims, 4 Drawing Figs.
[52] U.S. Cl. .................................................. 95/53.3,
 95/63
[51] Int. Cl. ...................................................... G03b 9/64
[50] Field of Search ............................................ 95/53, 53.3,
 63

[56] References Cited
UNITED STATES PATENTS
3,209,665 10/1965 Eberl ............................. 95/53.3

Primary Examiner— Norton Ansher
Assistant Examiner— Richard L. Moses
Attorney—March, Gillette and Wyatt ABSTRACT: In a camera having a shutter system opened by a drive mechanism and locked open for a predetermined time by an electro-magnet, it is essential that the electro-magnet shall be fully energised before the mechanism opening the shutter blades reverses its action to prepare to close them. For this purpose actuation of the shutter release first moves the shutter blade driving ring to close the electro-magnet energising contacts, whereafter a mechanical delay mechanism delays further movement of the ring by a time sufficient to fully energise the electro-magnet so that it is capable of holding the shutter blade system as soon as the blades subsequently open.

Patented Aug. 25, 1970
3,525,294
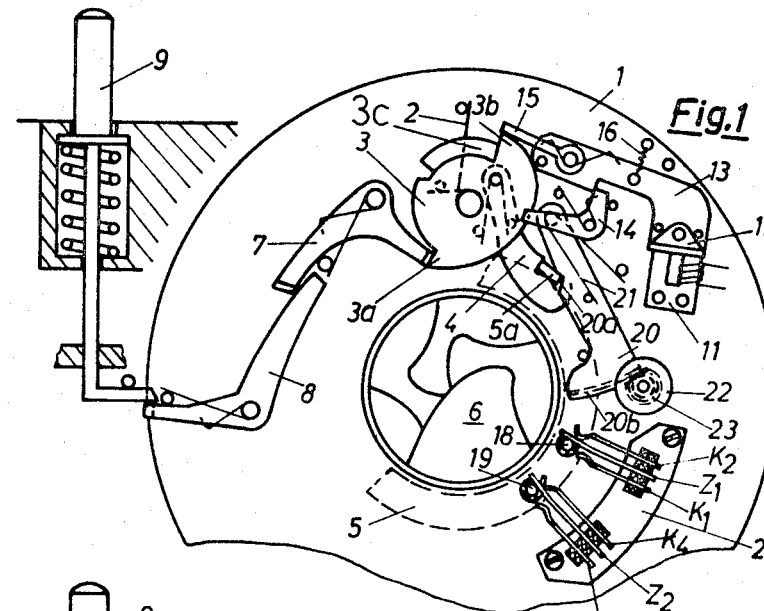
Fig.1
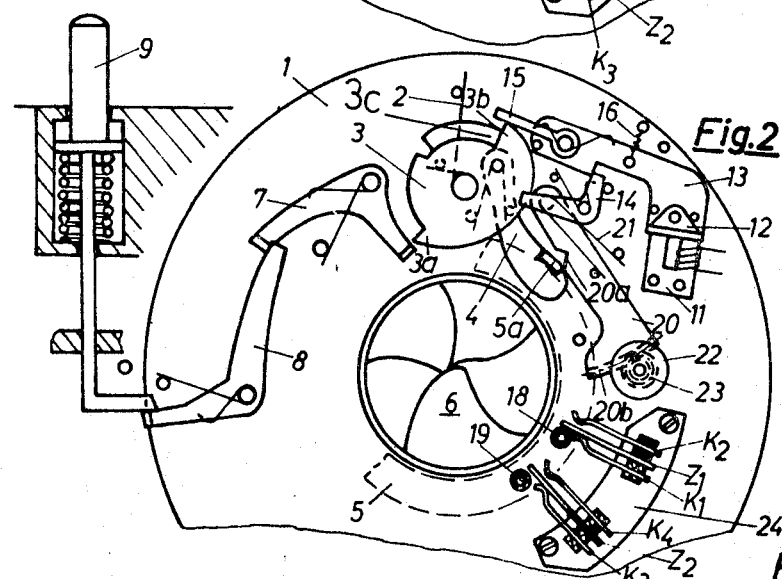
Fig.2
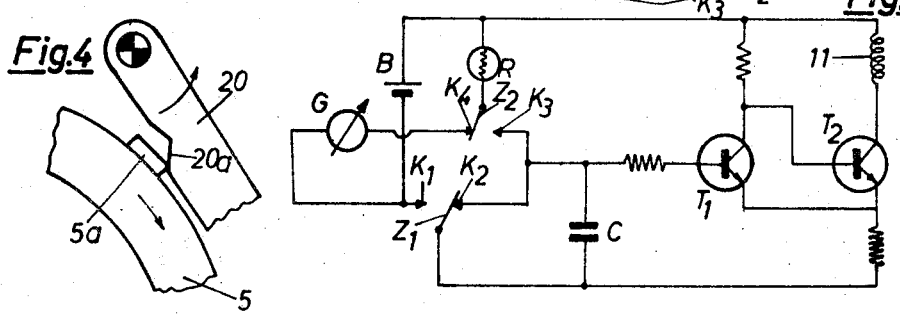
Fig.4
Fig.3
INVENTOR
Waldemar T. Rentschler
BY
March, Gillette & Wyatt
ATTORNEYS

SHUTTER OPENING DELAY MECHANISM

The invention concerns a camera shutter having a shutter blade system adapted to be moved into open and shut positions by means of a reciprocating driving member, an electronic timing device, and an electro-magnetic locking device to retain the shutter blade system in the open position for the duration of the shutter timing, the devices being connectable to a battery by means of a switch.

Camera shutters with electronic timing devices are known, in which switches for the current supply to the electronic timing device have been provided which are actuated by movement of the shutter release. In such shutters, in which the shutter drive is locked in a position corresponding to the open position of the shutter for the duration of the shutter timing, it is of particular importance that the current is switched on several milliseconds (ms) before locking is required, so that by the time this device is used the field of the locking magnet has been fully built up and hence the maximum attraction of the magnet is ensured. It is also necessary to allow time for contact bounce to subside fully before the locking device is brought into use.

In view of these conditions it is not usually satisfactory to actuate the switch of the electronic timing device at the beginning of the movement of the shutter drive, since in this case only a very short time exists in which to energise the locking device, which time, depending upon the shutter type, i.e. upon the opening time, lies between 1 and 5 milliseconds (ms). Such a time interval however does not ensure reliable and constant shutter locking. From experience gained with electronic shutters, adequate reliability of the shutter locking function is not obtained until the time interval between actuation of the switch and full energisation of the locking device amounts to more than 5 ms, such as may occur when the switch is actuated by means of the shutter release.

It is also advisable in electronic shutters to use an additional switch, usually designated as a parallel switch, which is actuated by a part of the shutter drive, preferably the shutter blade drive ring. Thus directly after releasing the shutter a parallel connection to the switch actuated by the release is provided, which maintains the current supply to the electronic timing device even if the release is returned to its normal position during the open period of the shutter. Continuity of the current supply is of importance more particularly for long time exposures, which may extend over several seconds.

Apart from the switches mentioned above, known electronic shutters also have a further switch by means of which timing is started. Such a switch is opened by a component of the released shutter drive, and opens a short-circuit previously formed across a timing capacitor. This charge starting switch is preferably also actuated by a shutter blade driving component such as the sector ring of the shutter blade system. To obtain a satisfactory and reliable functional action, known electronic shutters therefore require several switches with varying functions.

It is the object of the invention to avoid this multiplication of parts, i.e. to simplify and improve known switch arrangements so that the switch actuated by the camera release can be omitted whilst simultaneously improving the action of the electronic shutter mechanism.

According to our invention the magnet energising switch is moved by a released part of the shutter drive; associated with the drive is a retarding mechanism acting only in the starting phase of the action of the drive, which mechanism is so formed that between the time of actuating the switch and the start of opening of the shutter, a time interval occurs sufficient for the build up of the magnetic field in the electro-magnetic locking device. This arrangement permits the additional switch hitherto actuated by the camera release to be omitted, since its function is fully taken over by the switch influenced by the released part of the shutter drive. The retardation of the released part of the shutter drive not only ensures the necessary time interval for building up the magnetic field in the locking device of more than 5 ms.; it may also compensate for any mechanical time lag of the locking device.

It is of particular advantage both from a structural and functional point of view that the switch and retarding mechanism should co-operate with the reciprocating driving ring of the shutter blade system. It is also advantageous that the driving ring which opens and closes the shutter blade system is used not only for actuating the magnet energising switch but also to actuate a further switch or switches. This ensures a wide freedom for the location of the switches, and provides maximum accuracy from the electronic timing device.

To ensure as functionally reliable an arrangement as possible, with simple installation of the switches, provision is made for pre-assembling these components on an insulating base as a structural group, which is adapted to be mounted insertably and adjustably in the interior of the shutter. A useful feature is that the moving member of the magnet energising switch has an additional contact for discharging the timing capacitor associated therewith.

To obtain maximum functional reliability of the electronic shutter, it is proposed to use displacement escapement as the delaying device. To prevent this device from affecting the actual exposure time, it is further proposed for the delaying mechanism to act on the driving ring only in the overlap region of the shutter blade system.

The invention is described in detail below and illustrated in the accompanying drawings, showing:

FIG. 1 part of an electronic shutter in the cocked position.

FIG. 2 the same shutter arrangement after actuation of the camera release, the switches actuatable by the driving ring having changed over from one contact position to another.

FIG. 3 the circuit diagram of an electronic timing device for actuating the electro-magnetic locking device associated with the drive of the shutter blade system.

FIG. 4 on an enlarged scale part of the drive ring of the shutter blade system with a part of the delaying device acting directly thereon.

In the drawings, a base plate inserted in the housing of a shutter is denoted by the numeral 1. On this base plate a sliding crank drive subject to the action of a driving spring 2 is arranged comprised essentially of a shutter drive formed by a driving disc 3 and a driving pawl 4 connected thereto. The driving pawl 4 in turn is in driving engagement with a driving ring 5 and mounted so as to be rotatable coaxially with the lens aperture of the shutter housing, in such a manner that the driving ring during the action of the driving disc 3 executes a reciprocating movement from the cocked position shown in FIG. 1. The driving part 5 in turn acts on a shutter blade system formed of several sectors 6 which open and close the lens aperture. In the original position the shutter sectors have a relatively large overlap, such that the driving ring 5 at the beginning of the opening movement has to move a certain distance before the sectors 6 begin to let light through the lens. To lock the driving disc 3 in the cocked position of the shutter a rotatably mounted stop lever 7 is used which by means of the bell-crank lever 8, is adapted to be moved out of the stop position when the camera release 9 is depressed; during a subsequent cocking procedure the lever again assumes a position in front of a projection 3a.

An electro-magnetic mechanical locking device consisting of a magnet 11, an armature 12 co-operating therewith, a lever 13 carrying the armature and a catch lever 14 in operative connection with both the latter and with the driving disc 3. Co-axially with the armature lever 13 there is mounted a pawl 15 resiliently supported relative thereto, by means of which as shown in FIG. 1, the armature lever 13, when the driving disc 3 is transferred into the cocked position, is so displaceable that the armature is caused to abut against the magnet 11 against the action of a spring 16. The pawl 15 is so formed and arranged and the form of projection 3b on the driving disc 3 is so chosen that at the beginning of the movement of the driving disc the armature 12 is mechanically retained against the magnet 11. With a certain timed safety factor, this retention lasts until as explained hereinafter, a magnetic field has been built up in the magnet.

The above-described magnetic locking device co-operating with the driving disc 3 of the shutter blade system is energised by means of an electronic timing device which as shown in the circuit diagram of FIG. 3, is formed as a trigger circuit. As well as the two transistors $T_1$ and $T_2$ and the holding magnet, the two time-determining members, which are the photoelectric resistor R and capacitor C, are connected in the circuit of battery B. Furthermore a switch is connected in the circuit comprising a displaceable switching tongue $Z_1$ and a contact $K_1$. The object of this switch is directly after the beginning of the shutter drive action to connect the magnet 11 and hence simultaneously the electronic timing device to the battery. The switching tongue $Z_1$ also has a further contact $K_2$ associated therewith, which when in contact with $Z_1$ discharges the capacitor C. A reciprocating member of the drive of the shutter blade system, preferably the driving ring transferring the shutter into open and closed positions during exposure, is used to move the tongue $Z_1$. For this purpose a contact pin 18 is arranged on the driving ring 5 which, as shown in FIG. 1 retains the switching tongue $Z_1$ against contact $K_2$ in the cocked position of the shutter.

Apart from the switching arrangement described above, a change-over switch may be provided additionally comprising a switching tongue $Z_2$ and two contacts $K_3$ and $K_4$, the object of which switch is to switch the photoelectric resistor R (which may be a cadmium sulphide cell) into the electronic timing circuit during the shutter timing action. At other times provision is made for the photoelectric resistor R to be used to operate a light meter G, which before the beginning of the shutter release indicates to the photographer what exposure time is to be expected under the prevailing light conditions. The change-over of the photoelectric resistor R from the indicating circuit to the electronic timing device may occur after or simultaneously with, the actuation of the switch $Z_1$. To ensure correct interaction a further pin 19 is so arranged on the driving ring 5 of the shutter blade system that the contact tongue $Z_2$ in the cocked position of the shutter is retained against the contact $K_4$. Under these conditions the light meter G and the photoelectric resistor R is connected in series across the battery B. When the driving ring 5 starts to move, the contact tongue $Z_2$ follows the pin 19 and moves from contact $K_4$ to contact $K_3$ whereby the photoelectric resistor R is connected automatically in the circuit of the electronic timing device in order to act as a shutter time determining element.

As shown in FIGS. 1 and 2, the driving ring 5 of the shutter, reciprocating during exposure has associated therewith a delaying mechanism acting to temporarily arrest its action. This mechanism is formed as a displacement escapement and has a brake lever 20 co-operating with the driving ring 5 of the shutter blade system 6. The brake lever 20 is so located with respect to a flap 5a arranged on the driving ring 5 that it has a retarding effect on the shutter blade system only in the overlap phase of the segments 6, i.e. only at the beginning of the opening movement of the driving ring 5. In order to attain a smooth action without positive locking, the brake lever 20, as clearly shown in FIG. 4, is provided with an inclined sliding edge 20a, against which during the initial blade opening movement, the flap 5a on the driving ring strikes. The flap 5a may also be used to bring about the operational engagement of the driving ring 5 with the pawl 4. Owing to the force acting against the sliding edge 20a during the initial movement of the driving ring 5, the rotatably mounted brake lever 20 is displaced from the position shown in FIG. 1 against the action of a spring 21.

To ensure that the magnetic field in the magnet 11 has been built up before the armature 12 is no longer pressed mechanically against the magnet by means of the pawl 15, it is necessary for the delaying mechanism to be so formed and dimensioned as to provide an adequate time interval. If the inertia of the brake lever 20 alone is found to be insufficient, the lever may be additionally provided at its free end with a toothed rack 20b which meshes with a pinion 23 fixed to a fly wheel 22. The delaying mechanism 20 to 23 described above is not limited to the embodiment shown, and other arrangements may be used. The only essential condition is that they act only in the starting phase of the driving mechanism and only in the overlap phase of the shutter blade system, to delay the action of the ring 5.

The switch $Z_1$; $K_1$; $K_2$ may be arranged on an insulating base 24 and the latter in turn may be secured by means of simple holding means or screws on the base plate 1 of the shutter. The change-over switch $Z_2$; $K_3$; $K_4$ may also be arranged in a similar manner on the base. Preferably the base 24 is formed so that it carries not only the switch $Z_1$; $K_1$; $K_2$ but also the change-over switch $Z_2$; $K_3$; $K_4$.

The shutter arrangement described above operates as follows:

When the release 9 of the camera shutter is depressed, the driving ring 5 of the shutter blade system commences to move, the brake lever 20 being displaced from its normal position; the switching tongues $Z_1$ and $Z_2$ resiliently supported against the pins 18, 19 follow the pins and come into contact with the contacts $K_1$ or $K_3$. Up to the time of contact closure the armature 12 is kept mechanically in abutment with the magnet by the pawl 15 resting against the projection 3b of the driving disc 3. The contact movement mentioned above the magnet 11 to be connected to the battery voltage, and the photoelectric resistor R is changed over from the light meter G to the circuit of the electronic timing device. The shutter blade system 6 is still moving in the blade overlap region, whilst the driving member 5 as before continues its opening movement subject to the delaying influence of lever 20. The delay period of the delaying mechanism 20 to 23 is such that between the time of closing of the switch $Z_1,K_1$ and the beginning of the opening of the shutter blade system 6, a time interval of such magnitude exists, that the magnetic field of the magnet 11 is fully built up and no possible contact bounce of the switch $Z_1,K_1$ has any effect on the magnet. Generally 5 ms suffices as safety period with 10 ms as a maximum value. When the shutter blade system, in a time interval lying between the values mentioned above, has traversed the overlap region, the delaying mechanism 20 to 23, as shown in FIG. 2, ceases its delaying influence on the driving ring 5, so that the latter is now able to move without hindrance. This continues up to the reversal point of the sliding crank drive, at which a stop flap 3c provided on the driving disc 3 strikes against the trapping lever 14 of the locking device, whereby the shutter blade system is locked for the duration of the shutter timing in the open position. When the timing period ceases, the driving ring 5 after the driving disc 3 has been released, returns to its original position. Shortly before the driving ring has resumed its normal position, the pins 18, 19 arranged thereon connect the switching tongue $Z_1$ to the contact $K_2$ and the switching tongue $Z_2$ to the contact $K_4$. As a result, the capacitor C is discharged again and the photoelectric resistor R is changed over again from the switching circuit of the electronic timing device to the circuit of the light meter G. By means of a cocking device not shown, but which may be in operational engagement with the film wind, the shutter driving mechanism is restored to the cocked position shown in FIG. 1.

The arrangement described above, especially in shutters having oscillating sectors, acts remarkably well. It is however not limited to this kind of shutter but is also of use in shutters having a separate opening and closing system. In these shutters the delaying mechanism and the contact switches could be formed and arranged in the same manner as in shutters having oscillating sectors, the delaying mechanism affecting the opening drive whilst the contact switches are actuated by a part of the shutter driving mechanism, preferably the blade opening drive. In this case the actuation of the contact switches should preferably not be effected directly from the sector driving part, but by a control part actuatable by the latter, which in turn is returned to a normal position at the beginning of the closure of the shutter. The return could be effected by the dropping off of the locking device retaining the shutter drive in the open position. Such a return device would not involve additional expenditure, since where a photocell is used, a change-over switch ($Z_2$, $K_3$, $K_4$) has to be employed to cause the light meter to be switched in again after the shutter action. This return device may be purely mechanical, and its design is not critical relative to a contact switch.

I claim:

1. A camera shutter having a shutter blade system moved into open and closed positions by means of a reciprocating driving part, with an electronic timing device and an electro-magnetic locking mechanism retaining the shutter blade system in the open position for the duration of the shutter timing, which locking mechanism is connectable by means of a switch to a battery, comprising means actuated by a released part of the shutter drive to initially move said switch, means actuated during subsequent movement of said shutter drive to open said shutter blades, and a delaying mechanism acting on said shutter drive part during its movement, said delay mechanism being such as to provide a delay between the time of actuating said switch and the beginning of the opening of said shutter blades adequate to provide for the build-up of a magnetic field in said electro-magnetic locking device.

2. A camera shutter as recited in claim 1, characterised by a reciprocating shutter driving ring, and means on said ring to actuate said switch and said delaying mechanism.

3. A camera shutter as recited in claim 2, comprising further means on said driving ring to actuate at least one more switch.

4. A camera shutter as recited in claim 3, comprising a plurality of switches, an insulating base on which said switches are mounted to form a unit, and means for adjustably locating and fixing said unit in said shutter.

5. A camera shutter as recited in claim 1, comprising a contact associated with said switch and a connection from said contact to a capacitor in said electronic timing device.

6. A camera shutter as recited in claim 1, characterised by the feature that said delay mechanism includes a displacement escapement device.

7. A camera shutter as recited in claim 6, including means acting between said shutter driving part and said delaying mechanism whereby said mechanism acts only during the overlap region of said shutter blade system during the opening action of said blades.